United States Patent Office 2,898,494
Patented Aug. 4, 1959

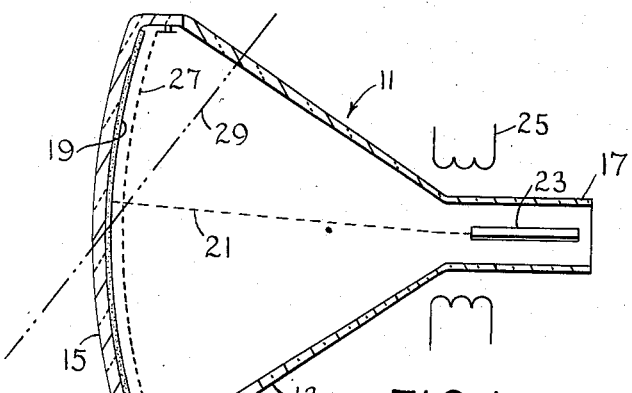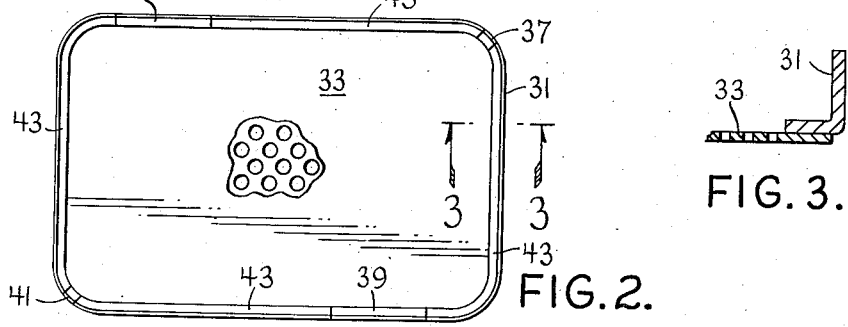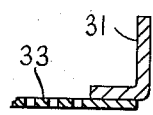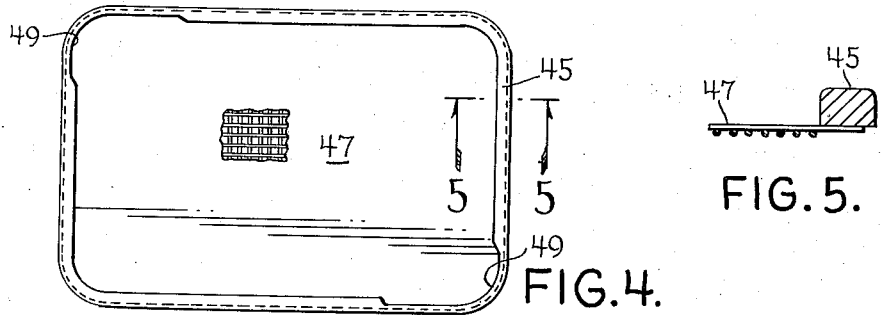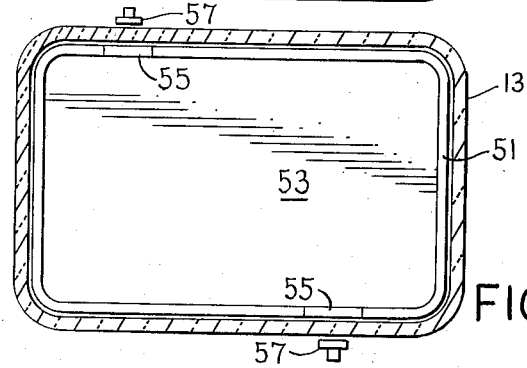

2,898,494
IMAGE DISPLAY DEVICE

Paul Haas, Seneca Falls, N.Y., assignor, by mesne assignments, to Sylvania Electric Products Inc., Wilmington, Del., a corporation of Delaware Application May 15, 1957, Serial No. 659,333

6 Claims. (Cl. 313—84)

This invention relates to image display devices and more particularly to picture tubes of the type employed in color television apparatus.

Color picture tubes adapted for operation in color television structures generally utilize one or more electron beams which may be directed to pass through a grid or aperture mask and impinge upon appropriately positioned red, green and blue color fluorescing bars, dots or stripes. The trajectory of the electron beams are effected by the tube geometry and by forces exerted by the earth's magnetic field and other magnetic fields in the screen area of the picture tube. These forces cause the beams to impinge upon the screen or panel of the tube at a position removed from the appropriate fluorescent material configuration, unless either the beam trajectory or the fluorescent configuration is corrected accordingly.

Although many factors responsible for mis-registry between the beam and its appropriate fluorescent dot have been reduced with the application of improved screen processing techniques, it is difficult to build into the tube a correction for the effects of the earth's magnetic field on the electron beam. This is particularly evident in those instances where the earth's field is non-uniformly distorted by the metallic parts within and surrounding the tube. Mis-registry between the electron beam and the fluorescent material configuration caused by distortion of the earth's field may be reduced to some extent by the provision of an appropriately shaped magnetic shield formed to enclose the entire cone portion of the tube. Although such a shield has proven to be reasonably effective, it is an expensive item to fabricate and assemble. In addition, such a structure requires the use of auxiliary assembly components, which tend to multiply the television chassis lay-out and cabinet design problems.

Accordingly, an object of the invention is to reduce the aforementioned disadvantages.

Another object is the provision of a substantially non-distorted or uniformly distorted magnetic field in the viewing panel region of a cathode ray tube.

A further object is to enhance the color purity of a color image display.

The foregoing objects, as well as other objects which will be apparent upon reference to the following description and accompanying drawings, are achieved in one aspect of the invention by the provision of a structure for a cathode ray tube or its assembly which has associated therewith prescribed sections or materials with given reluctance characteristics capable of controlling the distortion of the magnetic fields in the region of the viewing panel of the tube.

For a better understanding of the invention, reference is made to the accompanying drawings in which:

Fig. 1 is a sectional view of a typical cathode ray tube;

Fig. 2 is a plan view of an aperture mask adapted to be employed in the structure shown in Fig. 1;

Fig. 3 is a section of the mask shown in Fig. 2 taken along line 3—3;

Fig. 4 is a plan view of another grid structure adapted to be employed in the tube structure shown in Fig. 1;

Fig. 5 is a cross-sectional view taken along line 5—5 of structure shown in Fig. 4; and Fig. 6 is a view showing the end portion of a cathode ray tube assembly employing another type of grid structure.

Referring to Fig. 1, a cathode ray tube 11, which is adapted to be employed in a color television apparatus, is shown comprising an envelope 13 having a viewing panel 15 oppositely disposed from neck portion 17. Positioned on the internal surface of panel 15 is a fluorescent screen 19, which may comprise patterns of blue, green and red color fluorescing bars, dots or stripes. An electron beam or beams 21 emitted from one or more cathodes 23 are deflected by coils 25 to cause beams 21 to scan the viewing area of screen 19. The peripheral portion 26 of panel 15 may be made of glass, as shown, or of metal. A grid or mask 27 may be positioned within envelope 11 to provide masking and/or deflection of beam 21.

It has been found that the force exerted by the earth's magnetic field affects the trajectory of electron streams 21. If means are not provided to reduce this force, an impure color image will result since the electrons will impinge upon screen 19 at positions other than at the prescribed positions. One of the difficulties encountered in fabricating tubes which are reasonably free from color purity resides in the fact that the earth's magnetic field is not uniformly distorted within the tube over the screen area. In the Northern Hemisphere, and for most orientations, it has been observed that the least noticeable mis-registry initially occurs in the second and fourth quadrants. However, after the tube has been set-up to produce a color image which has maximum color purity over the entire viewing area, the most noticeable mis-registry occurs in those areas which originally have the best color purity, i.e. the second and fourth quadrants. It is surmised from this observation that the magnetic field strength over those portions of the screen is smaller in magnitude than that over the remainder of the screen. Since the direction of the earth's field, as illustrated by the numeral 29 in Fig. 1, is generally at some acute angle with the screen of the tube, it is believed that one of the major causes of a decreased field strength in the second and fourth quadrants results from the shunting effect of the frame which supports grid 27 and, in some instances, by the band of metal which is sometimes used to serve as the peripheral portion 26 of panel 15. Additional distortion of the earth's magnetic field in the screen region of the tube 11 is also believed to be caused by the configuration of mask 27, and in the cross-sectional shape of the frame used to support the mask. Although mis-registry varies with the horizontal orientation of the tube, it is most noticeable in those instances where the horizontal component of the earth's field lies substantially along the axis of the tube and is directed from the interior of the tube and toward the screen. The drawings illustrate several structures formed to control the distortion of the earth's magnetic field.

Referring to Figs. 2 and 3, an L-shaped frame 31 for supporting an aperture mask 33 of the type which may be utilized in tube 11, is shown comprising sections or links 35, 37, 39, and 41 inter-connecting other sections or links 43. The frame is shaped substantially as a loop, and the links and sections are formed to provide connecting strips having different magnetic reluctances per unit length. For example, sections 43 may be made of a low carbon steel while links or sections 35, 37, 39 and 41 may be made of stainless steel. It has been found that proper selection of materials and their cross-sectional shapes, and proper positioning of the sections and links relative to one another will provide a control for the distortion of the earth's field so that an acceptable color pure image may be achieved. In the example shown in Fig. 2, sections 35, 37, 39 and 41 may have a higher reluctance than sections 43. A structure of this type has higher total reluctance for the loop. In addition, the higher reluctance sections or links are positioned to provide a minimum amount of shunting over those areas of the screen which have been found to have the largest degree of misregistry after the tube has been set up. It is to be understood that some of the sections or links 35, 37, 39, 41 and 43 may be made of ferro-magnetic, para-magnetic, dia-magnetic or non-magnetic materials, so long as the sections are positioned around grid 33 to provide minimum non-uniform distortion of the earth's field over the screen area. The number of sections used to fabricate frame 31 will depend upon the materials selected, the cross-sectional shape of the sections, the configuration of the picture tube, the magnitude and direction of the earth's field, etc.

Figs. 4 and 5 show another type of grid electrode capable of enhancing the reproduction of color images. In this illustration, the electrode may comprise a frame 45 formed to support a crossed-grid type structure 47. The frame is shown with cut-out sections or links 49 which have a higher reluctance per unit length than the remaining sections of frame 45. It is apparent that the total reluctance of the frame is increased, and also that the earth's field in the viewing area adjacent sections or links 49 is less distorted. The cross-sectional form of frame 31 shown in Figs. 2 and 3 may also be altered in the same manner to achieve similar results.

Another method of reducing the non-uniform distortion of the earth's field is by the provision of an internally disposed permanent magnet and/or an externally disposed magnet 57 as shown in Fig. 6. In this illustration, the frame 51, with its mask or grid 53, is shown positioned within envelope 13. Frame 51 may comprise a para-magnetic material while sections or links 55 may be formed as a permanent magnet. Therefore, the strength of the earth's field adjacent sections 55 may be supplemented by the field of the permanent magnet. In the same manner, externally disposed magnets 57 may be used to supplement the earth's field over those portions of the screen which are most noticeable for color impurity. These magnets may also be advantageously used in connection with the embodiments of the invention shown in Figs. 2 through 5 inclusive. For instance, in Fig. 2, if section or link 39 was fabricated from a para-magnetic, dia-magnetic, or non-magnetic material, the reluctance of this section would be decreased relative to adjacent portions of frame 31. An adjustable magnet such as magnet 57 could then be positioned relative to link 39 to supplement, as desired, the field strength existing near the viewing area of the screen adjacent the link.

Cathode ray tube structures and assemblies fabricated in accordance with the invention provide improved color images. It is to be understood that the structures illustrated herein are not limited to the mask or grid frames, but are equally applicable to the metal peripheral portion of the viewing panel, when used, and to any other structure employed internally or externally and adjacent to the screen for the purpose of affecting the impinging position of the electrons.

Although several embodiments of the invention have been shown and described, it will be apparent to those skilled in the art that various changes and modifications may be made therein without departing from the scope of the invention as defined by the appended claims.

What is claimed is:

1. An electrode for a cathode ray tube comprising a frame with an associated grid structure, said frame being formed to provide a loop having at least two sections, one of said sections having a higher reluctance than the other of said sections.

2. An electrode for a cathode ray tube comprising a frame with an associated grid structure, said frame being formed to provide a loop having first sections with a given reluctance and other sections with a higher reluctance, said first and other sections being arranged alternately around said loop.

3. An electrode for a cathode ray tube comprising a frame with an associated grid structure, said frame being formed to provide spaced sections of a given reluctance and links connecting said sections having a reluctance different from the reluctance of said sections.

4. A cathode ray tube having an envelope, a viewing panel, a cathode positioned within said envelope providing an electron beam directed to impinge upon said viewing panel, and an electrode positioned within said envelope adjacent the viewing panel to influence the impinging position of said electron beam, said electrode having a frame portion formed to provide a loop having at least two sections, one of said sections having a different reluctance than the other of said sections.

5. A cathode ray tube having an envelope, a viewing panel, a cathode positioned within said envelope providing an electron beam directed to impinge upon said viewing panel, a grid structure having a frame portion spaced from said panel, said frame portion having at least two associated parts, one of said parts comprising a permanent magnet formed and positioned internally of said envelope to influence the impinging position of said electron beam.

6. A cathode ray tube assembly having an envelope, a viewing panel, a cathode positioned within said envelope providing an electron beam directed to impinge upon said viewing panel, an electrode having a frame portion spaced from said viewing panel, said frame portion having at least two sections, one of said sections having a different reluctance than the other of said sections, and at least one magnet disposed externally of said envelope positioned relative to the frame portion sections to influence the impinging position of said electron beam.

References Cited in the file of this patent

UNITED STATES PATENTS

| | | |
|---|---|---|
| 2,541,446 | Trott | Feb. 13, 1951 |
| 2,816,244 | Hillegass | Dec. 10, 1957 |